(12) United States Patent
Veljkovic et al.

(10) Patent No.: US 11,022,094 B2
(45) Date of Patent: Jun. 1, 2021

(54) MODULAR BLADE STRUCTURE AND METHOD OF ASSEMBLY

(71) Applicant: General Electric Company, Schenectady, NY (US)

(72) Inventors: Danilo Veljkovic, Ypsilanti, MI (US); Brian Scott Redmon, Baker, FL (US); Roland Joseph Menassa, Macomb, MI (US); Thomas Merzhaeuser, Munich (DE); Daniel Alan Hynum, Greenville, SC (US); Alan M. Walker, Simpsonville, SC (US); Shridhar Champaknath Nath, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 504 days.

(21) Appl. No.: 15/603,929

(22) Filed: May 24, 2017

(65) Prior Publication Data

US 2018/0340511 A1 Nov. 29, 2018

(51) Int. Cl.
*F03D 1/06* (2006.01)
*F03D 13/10* (2016.01)
(Continued)

(52) U.S. Cl.
CPC ........ *F03D 1/0675* (2013.01); *B29C 65/7805* (2013.01); *B29D 99/0028* (2013.01);
(Continued)

(58) Field of Classification Search
CPC .............. F03D 1/0675; F05B 2230/604; F05B 2230/61; B29C 65/7805; B29D 99/0028; B29L 2031/085
(Continued)

(56) References Cited

U.S. PATENT DOCUMENTS

2009/0169379 A1 7/2009 McClintic
2013/0058759 A1 3/2013 Fang et al.
(Continued)

FOREIGN PATENT DOCUMENTS

CN 104080592 A 10/2014
EP 2 434 152 A2 3/2012
(Continued)

OTHER PUBLICATIONS

Misumi, Locating Pins Pt. 2; Types of Locating, Aug. 10, 2015, YouTube, Time 0:00 to 4:00 (Year: 2015).*
(Continued)

*Primary Examiner* — Connor J Tremarche
(74) *Attorney, Agent, or Firm* — Dority & Manning, P.A.

(57) ABSTRACT

The present disclosure is directed to a method of assembly of a rotor blade for a wind turbine. The method includes placing a first rotor blade section onto a first set location of an assembly fixture, wherein the first rotor blade includes a first locating datum such that the assembly fixture at the first set location constrains movement of the first rotor blade section at the first locating datum along a first direction; placing the first rotor blade section onto a second set location of the assembly fixture, wherein the first rotor blade includes a second locating datum such that the assembly fixture at the second set location constrains movement of the first rotor blade section at the second locating datum along a second direction; and positioning a second rotor blade section onto the first rotor blade section within the assembly fixture.

18 Claims, 5 Drawing Sheets

(51) Int. Cl.
*B29C 65/78* (2006.01)
*B29D 99/00* (2010.01)
*B29L 31/08* (2006.01)

(52) U.S. Cl.
CPC ... *B29L 2031/085* (2013.01); *F05B 2230/604* (2013.01); *F05B 2230/61* (2013.01)

(58) Field of Classification Search
USPC ......................................................... 416/323
See application file for complete search history.

(56) References Cited

U.S. PATENT DOCUMENTS

| | | | |
|---|---|---|---|
| 2014/0271217 A1* | 9/2014 | Baker | F03D 1/0633 416/226 |
| 2014/0322023 A1 | 10/2014 | Tapia | |
| 2014/0368830 A1* | 12/2014 | Michelt | G01B 11/0608 356/485 |
| 2015/0056081 A1* | 2/2015 | De Waal Malefijt | B29C 31/00 416/241 R |
| 2015/0064391 A1* | 3/2015 | Trondl | B63B 35/7909 428/80 |
| 2015/0308404 A1* | 10/2015 | Dahl | B29C 70/342 416/230 |
| 2016/0186721 A1 | 6/2016 | Huang | |
| 2016/0375631 A1* | 12/2016 | Encinosa | B29D 99/0014 156/91 |

FOREIGN PATENT DOCUMENTS

| | | |
|---|---|---|
| WO | 2009/109619 A2 | 9/2009 |
| WO | 2016006008 A1 | 1/2016 |
| WO | 2016008530 A1 | 1/2016 |

OTHER PUBLICATIONS

Dolan et al., Directions for Wind Industry in Massachusetts, Worcester Polytechnic Institute, Oct. 14, 2011.

Fu et al., "Innovative Optical Scanning Technique and Device for Three-Dimensional Full-Scale Measurement of Wind-Turbine Blades", Special Section on Advances of Precision Optical Measurements and Instrumentation for Geometrical and Mechanical Quantities, vol. 53, Issue 12, Jul. 10, 2014.

Bhat et al., "Structural Performance Evaluation of Modularized Wind Turbine Blade Through Finite Element Simulation", Journal of Energy and Economic Development, vol. 1, Issue 1, pp. 79-90, Aug. 2015.

Liu, P., et al., "3D monitoring of 1 delamination growth in a wind turbine blade composite using optical coherence tomography", NDT & E International, vol. 64, pp. 52-58 (Jun. 2014).

Extended European Search Report and Opinion issued in connection with corresponding EP Application No. 18172462.6 dated Jan. 7, 2019.

* cited by examiner

MODULAR BLADE STRUCTURE AND METHOD OF ASSEMBLY

FIELD

The present disclosure relates in generally to rotor blades, and more specifically to methods and apparatus for forming rotor blades.

BACKGROUND

Wind power is considered one of the cleanest, most environmentally friendly energy sources presently available, and wind generators have gained increased attention in this regard. A modern wind generator typically includes wind turbine and a generator. The wind turbine typically includes a tower, gearbox, nacelle, and one or more rotor blades. The generator is typically housed in the nacelle. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid. Further, wind generators are typically grouped together in a wind farm, and may be onshore or offshore.

Rotor blades are generally constructed as a single piece with manufacturing methods generally customized or tailored to the single piece, model, length, etc. of the rotor blade being assembled. Such customized or tailored manufacturing may generally increase production cost and time for rotor blades, thereby hindering further use and availability of wind turbines for wind power.

Accordingly, improved methods and structures for forming rotor blades are desired in the art such that may enable further production and availability of rotor blades.

BRIEF DESCRIPTION

Aspects and advantages of the invention will be set forth in part in the following description, or may be obvious from the description, or may be learned through practice of the invention.

The present disclosure is directed to a method of assembly of a rotor blade for a wind turbine. The method includes placing a first rotor blade section onto a first set location of an assembly fixture, wherein the first rotor blade includes a first locating datum such that the assembly fixture at the first set location constrains movement of the first rotor blade section at the first locating datum along a first direction; placing the first rotor blade section onto a second set location of the assembly fixture, wherein the first rotor blade includes a second locating datum such that the assembly fixture at the second set location constrains movement of the first rotor blade section at the second locating datum along a second direction; and positioning a second rotor blade section onto the first rotor blade section within the assembly fixture.

In various embodiments, placing the first rotor blade section onto the first set location of the assembly fixture includes determining a spatial position of the first locating datum of the first rotor blade section; determining a spatial position of the first set location of the assembly fixture; and placing the first locating datum of the first rotor blade section onto the first locating datum of the assembly fixture. In one embodiment, determining the spatial position includes measuring the first rotor blade section and the assembly fixture using an optical coherence tomography measurement system.

In another embodiment, placing the first rotor blade section onto the second set location of the assembly fixture includes determining a spatial position of the second locating datum of the first rotor blade section; determining a spatial position of the second set location of the assembly fixture; and placing the second locating datum of the first rotor blade section onto the second locating datum of the assembly fixture.

In still various embodiments, placing a first rotor blade section onto the first set location of the assembly fixture includes constraining the first rotor blade section along a transverse direction. In one embodiment, placing the first rotor blade section onto the first set location includes placing the first rotor blade into one or more first slots defined generally along a longitudinal direction included in the assembly fixture.

In various embodiments, placing a first rotor blade section onto the second set location of the assembly fixture includes constraining the first rotor blade section along a longitudinal direction. In one embodiment, placing the first rotor blade section onto the second set location includes placing the first rotor blade into one or more second slots defined generally along a transverse direction included in the assembly fixture.

In one embodiment, the first rotor blade section includes one or more of a root section or a mid-section each defining a pressure side or a suction side, a leading edge and a trailing edge, and placing the first rotor blade section onto the first set location of the assembly fixture defines a contour corresponding to the first rotor blade section.

In another embodiment, positioning the second rotor blade section onto the first rotor blade section within the assembly fixture includes positioning the second rotor blade section comprising one or more of a root section or a mid-section each defining a suction side or a pressure side generally corresponding to the pressure side or suction side of the first rotor blade section.

In various embodiments, the method further includes placing a structural member onto the first rotor blade section within the assembly fixture. In one embodiment, placing a structural member includes positioning a spar box, a T-box, or shear web within the first rotor blade section.

In another embodiment, placing a first rotor blade section onto a third set location of an assembly fixture, in which the first rotor blade includes a third locating datum defining a locating orifice along a span-wise flange of the first rotor blade section.

The present disclosure is further directed to a rotor blade assembly for a wind turbine. The rotor blade assembly includes a first rotor blade section defining a root section or a mid-section. The first rotor blade section defines a first exterior surface defining a pressure side or a suction side, and the first exterior surface defines a first locating datum and a second locating datum.

In one embodiment of the rotor blade assembly, the first locating datum defines a transverse constraining feature extended at least partially along a longitudinal direction.

In another embodiment, the second locating datum defines a longitudinal constraining feature extended at least partially along a transverse direction.

In still another embodiment of the rotor blade assembly, the first locating datum and/or the second locating datum defines a platform extended outward from the first exterior surface of the first rotor blade section.

In yet another embodiment, the first locating datum and/or the second locating datum defines a slot extended at least partially along a longitudinal direction or a transverse direction.

In various embodiments, the rotor blade assembly further includes a second rotor blade section defining a root section or a mid-section. The second rotor blade section defines a second exterior surface defining a suction side or a pressure side generally corresponding to the pressure side or suction side of the first rotor blade section, and the second rotor blade section is coupled to the first rotor blade section.

In still yet another embodiment of the rotor blade assembly, the first rotor blade section and the second rotor blade section together define a flange extended generally from root to tip of the rotor blade assembly, in which the flange defines a third locating datum through the flange.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
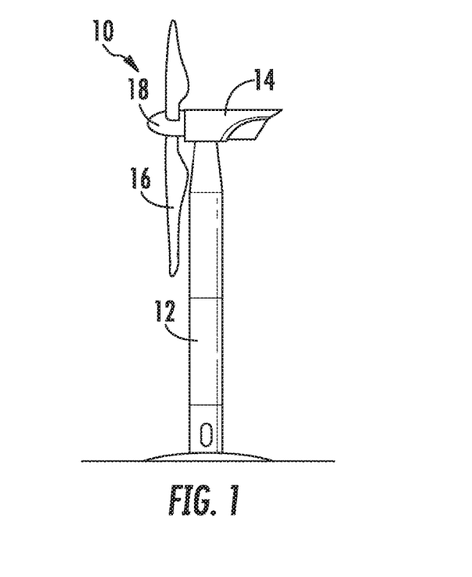
FIG. 1 is a side view of a wind turbine according to one embodiment of the present disclosure.

FIG. 1 illustrates a wind turbine 10 of conventional construction. The wind turbine 10 includes a tower 12 with a nacelle 14 mounted thereon. A plurality of rotor blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

Figure 2:
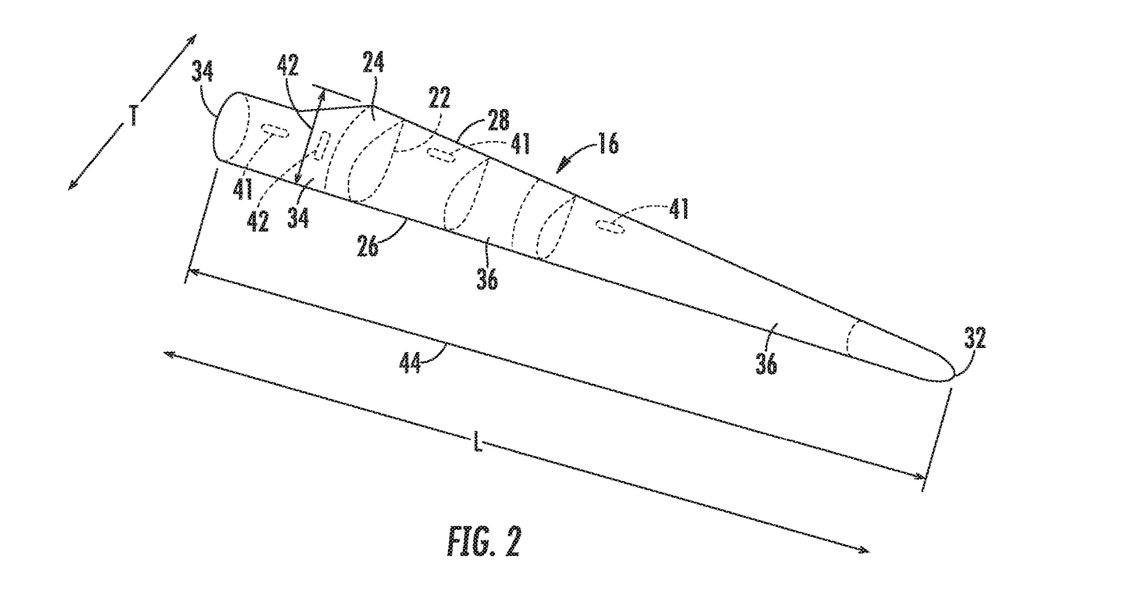
FIG. 2 is a perspective view of an exemplary embodiment of a rotor blade for the wind turbine shown in FIG. 1 according to an aspect of the present disclosure.

Referring to FIG. 2, a rotor blade 16 according to the present disclosure may include exterior surfaces defining a pressure side 22 and a suction side 24 extending between a leading edge 26 and a trailing edge 28, and may extend from a blade tip 32 to a blade root 34. The exterior surfaces may be generally aerodynamic surfaces having generally aerodynamic contours, as is generally known in the art.

In some embodiments, the rotor blade 16 may include a plurality of individual blade segments aligned in an end-to-end order from the blade tip 32 to the blade root 34. Each of the individual blade segments may be uniquely configured so that the plurality of blade segments define a complete rotor blade 16 having a designed aerodynamic profile, length, and other desired characteristics. For example, each of the blade segments may have an aerodynamic profile that corresponds to the aerodynamic profile of adjacent blade segments. Thus, the aerodynamic profiles of the blade segments may form a continuous aerodynamic profile of the rotor blade 16.

The rotor blade 16 may, in exemplary embodiments, be curved. Curving of the rotor blade 16 may entail bending the rotor blade 16 in a generally flapwise direction and/or in a generally edgewise direction. The flapwise direction may generally be construed as the direction (or the opposite direction) in which the aerodynamic lift acts on the rotor blade 16. The edgewise direction is generally perpendicular to the flapwise direction. Flapwise curvature of the rotor blade 16 is also known as pre-bend, while edgewise curvature is also known as sweep. Thus, a curved rotor blade 16 may be pre-bent and/or swept. Curving may enable the rotor blade 16 to better withstand flapwise and edgewise loads during operation of the wind turbine 10, and may further provide clearance for the rotor blade 16 from the tower 12 during operation of the wind turbine 10.

The rotor blade 16 may further define a chord 42 and a length or span 44. As shown, the chord may vary throughout the span 44 of the rotor blade 16. Thus, a local chord may be defined for the rotor blade 16 at any point on the rotor blade 16 along the span 44.

Figure 3:
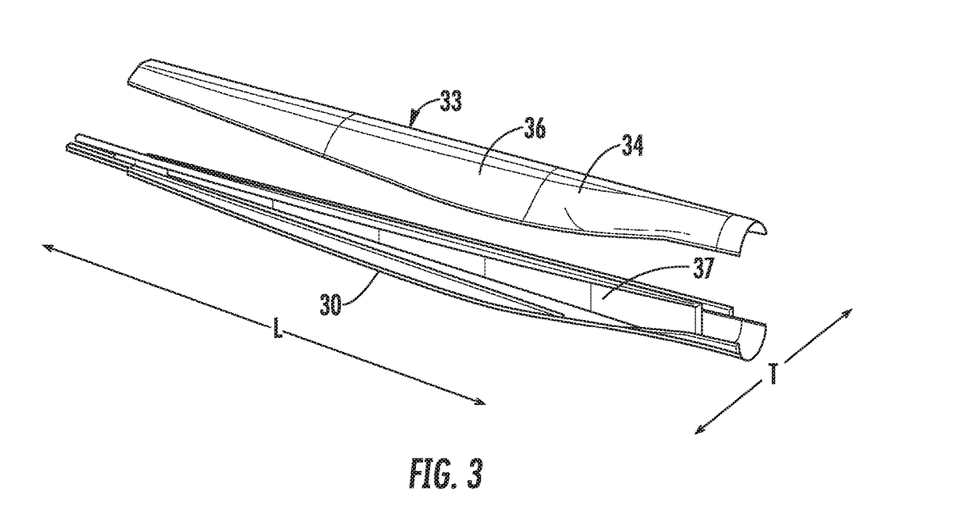
FIG. 3 is a partially exploded view of another exemplary embodiment of a rotor blade for the wind turbine shown in FIG. 1 according to another aspect of the present disclosure.
Figure 4:
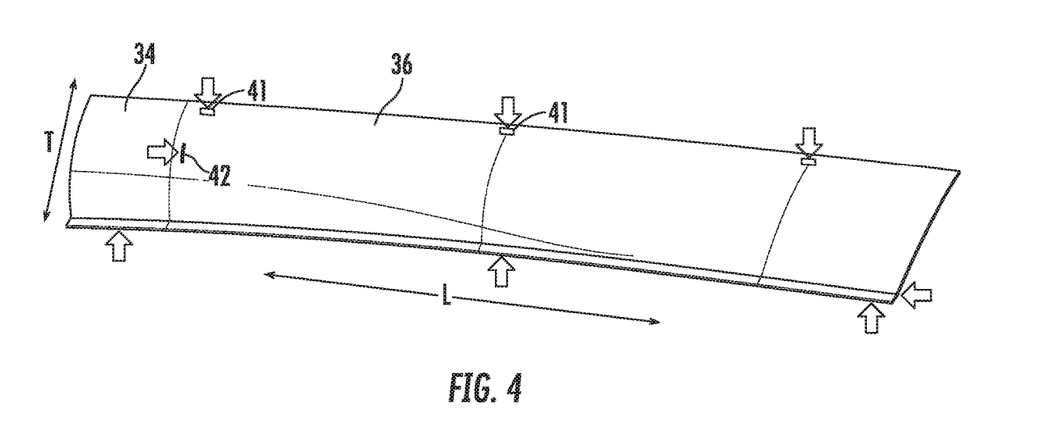
FIG. 4 is a perspective view of another exemplary embodiment of a rotor blade for the wind turbine shown in FIG. 1.

Referring now to FIGS. 2-4, the rotor blade 16 may define a first rotor blade section 30 and a second rotor blade section 33. Each rotor blade section 30, 33 may define a root section 34 and a mid-section 36. The first rotor blade section 30 defines a first exterior surface 31 defining the pressure side 22 or the suction side 24 of the first rotor blade section 30. The first exterior surface 31 defines a first locating datum 41 and a second locating datum 42. In one embodiment, such as shown in FIG. 2, the first locating datum 41 and the second locating datum 42 each define an extended slot. For example, as shown in FIG. 2, the first locating datum 41 defines a hole or slot extended generally along a longitudinal direction L. In another embodiment, the second locating datum 42 defines a hole or slot extended generally along a transverse direction T. In various embodiments, each of the first locating datum 41 and the second locating datum 42 may be disposed across one or more of the root section 34 and mid-section 36 of the first rotor blade section 30.

Referring now to FIG. 4, the first locating datum 41 and the second locating datum 42 may each define a platform, pad, or raised surface extended outward from the first exterior surface 31 of the first rotor blade section 30. For example, the first locating datum 41 may define the platform, pad or raised surface as molded or extruded extended generally along the longitudinal direction L. As another example, the second locating datum 42 may define the platform, pad, or raised surface as molded or extruded extended generally along the transverse direction T.

Figure 5:
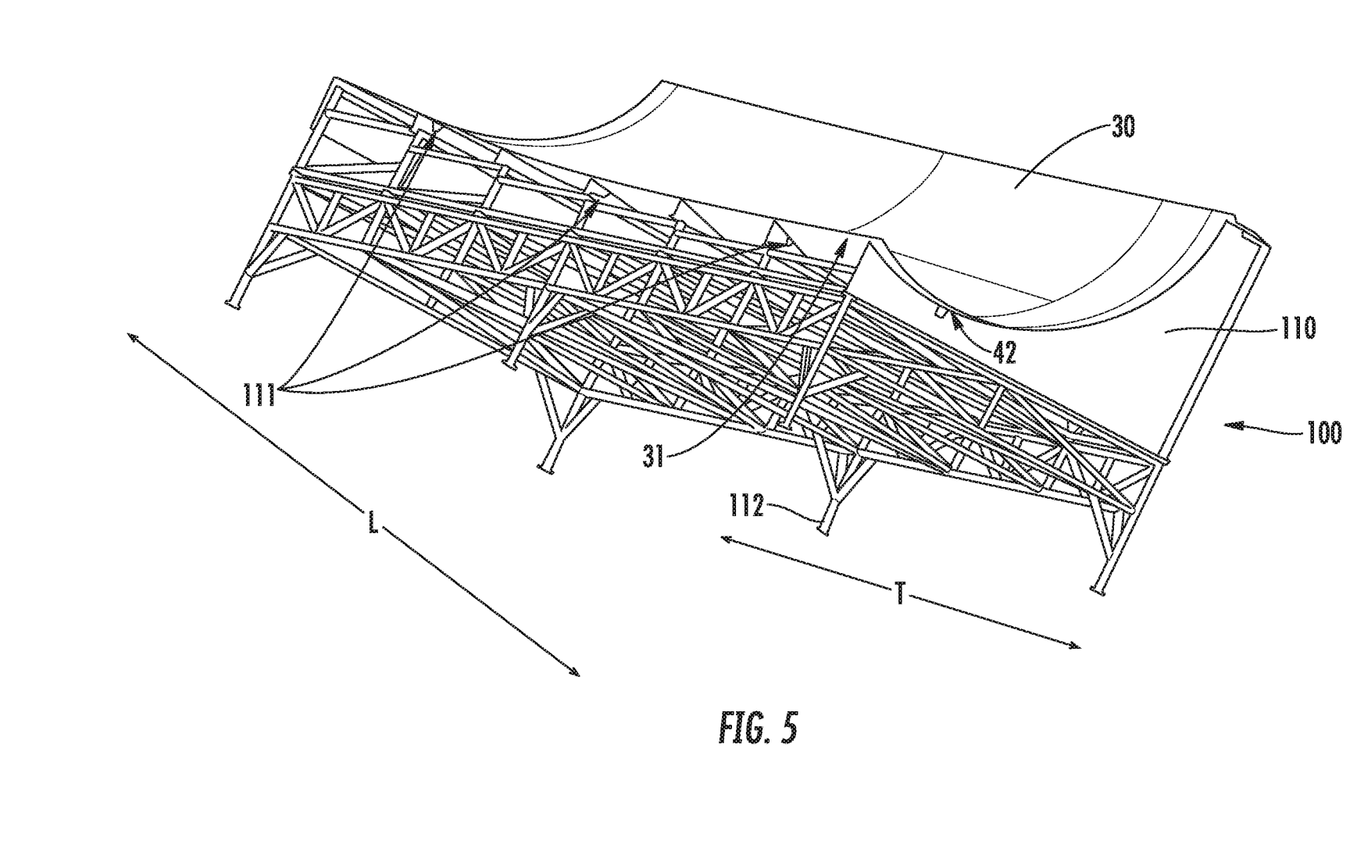
FIG. 5 is a perspective view of an embodiment of an assembly fixture for the embodiments of the rotor blade generally provided in FIGS. 2-5.
Figure 6:
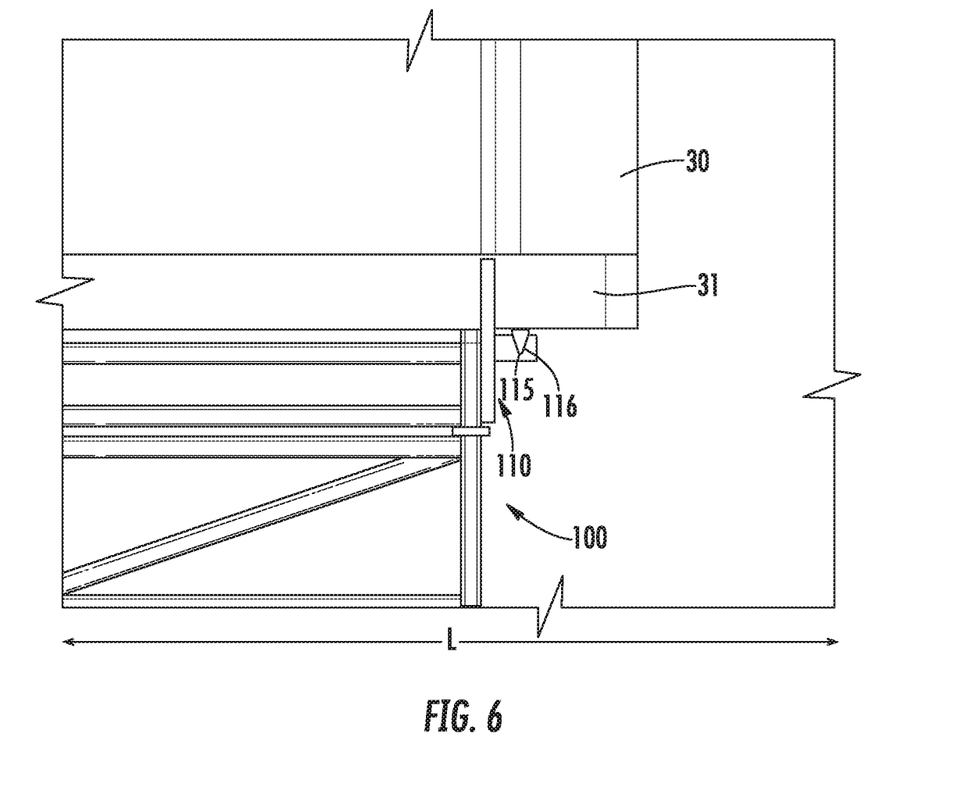
FIG. 6 is a side view of an embodiment of the assembly fixture shown in FIG. 5.

Referring now to FIG. 5, an exemplary embodiment of an assembly fixture 100 is generally provided onto which the first rotor blade section 30 is placed during assembly. The assembly fixture 100 generally includes a frame 110 defining a contoured plane generally conforming or corresponding to the first exterior surface 31 of the first rotor blade section 30. The frame 110 may define a first set location 111 such that the assembly fixture 100 at the first set location 111 constrains or restricts movement of the first rotor blade section 30 at the first locating datum 41 along a first direction. The frame 110 may further define a second set location 112 such that the assembly fixture 100 at the second set location 112 constrains or restricts movement of the first rotor blade section 30 at the second locating datum 42 along a second direction. In various embodiments, the first direction may define the transverse direction T, such that the first set location 111 and the first locating datum 41 each define a transverse constraining feature. In still various embodiments, the second direction may define the longitudinal direction L, such that the second set location 112 and the second locating datum 42 each define a longitudinal constraining feature.

As shown in FIG. 5, the first set location 111 of the frame 110 may define a slot 115 through which the first locating datum 41 defining a pad or raised structure of the first rotor blade section 30 may place into the first set location 111 defined by the slot 115 in the frame 110. In various embodiments, such as shown in FIG. 5, the slot 115 within the frame 110 defines a wedge or draft angle 116 cut generally along the longitudinal direction L such that the first rotor blade section 30 fits into the first locating datum 41 accurately and with sufficient constraint along the transverse direction T.

Similarly, the second set location 112 of the frame 110 may define a slot 117 through which the second locating datum 42 defining a pad or raised structure of the first rotor blade section 30 may place into the second set location 112 defined by the slot 117 in the frame 110. In still various embodiments, the slot 117 within the frame 110 defines a wedge or draft angle 116, such as shown in FIG. 5, cut generally along the transverse direction T such that the first rotor blade section 30 fits into the first locating datum 42 accurately and with sufficient constrain along the longitudinal direction L.

Referring to FIGS. 2-6, in various embodiments, the first locating datum 41 defining transverse constraining platforms may fix or locate the first rotor blade section 30 in a first direction and the second locating datum 42 defining longitudinal constraining platforms may fix or locate the first rotor blade section 30 in a second direction and onto the assembly fixture 100. The first set location 111 and the second set location 112 of the frame 110 each may define the wedge or draft angle 116 such that the respective first locating datum 41 and second locating datum 42 wedges or fixes accurately onto the frame 110.

Referring back to FIGS. 2-4, the rotor blade 16 further includes a second rotor blade section 33 defining a root section 34 and/or a mid-section 36. The second rotor blade section 33 defines a second exterior surface 35 defining a suction side 24 or a pressure side 22 generally corresponding to the pressure side 22 or suction side 24 of the first rotor blade section 30. The second rotor blade section 33 is coupled to the first rotor blade section 30.

Referring back to FIG. 3, the rotor blade 16 generally includes a structural member 37 disposed between the first rotor blade section 30 and the second rotor blade section 33. The structural member 37 generally includes a spar box, a T-box, or shear web. In various embodiments, the structural member 37 is a single integral member, such as extended span-wise direction throughout the entire span 44. In other embodiments, the structural member 37 may be provided in separate components along the entire span 44, or may be provided in only a portion of the span 44.

Referring to FIGS. 2-6, in various embodiments, the rotor blade 16, including the first rotor blade section 30, the second rotor blade 33, and/or the structural member 37, may be formed of one or more composite materials or combinations thereof. The composite materials may be formed from, for example, suitable polymers, such as thermoplastics or thermosets, with biaxial fibers embedded therein. Suitable polymers include, for instance, polyolefins (e.g., polypropylene, propylene-ethylene copolymers, etc.), polyesters (e.g., polybutylene terephalate ("PBT")), polycarbonates, polyamides (e.g., Nylon™), polyether ketones (e.g., polyetherether ketone ("PEEK")), polyetherimides, polyarylene ketones (e.g., polyphenylene diketone ("PPDK")), liquid crystal polymers, polyarylene sulfides (e.g., polyphenylene sulfide ("PPS"), poly(biphenylene sulfide ketone), poly(phenylene sulfide diketone), poly(biphenylene sulfide), etc.), fluoropolymers (e.g., polytetrafluoroethylene-perfluoromethylvinylether polymer, perfluoro-alkoxyalkane polymer, petrafluoroethylene polymer, ethylene-tetrafluoroethylene polymer, etc.), polyacetals, polyurethanes, polycarbonates, styrenic polymers (e.g., acrylonitrile butadiene styrene ("ABS")), and so forth. Suitable fiber materials include, for example, metal fibers, glass fibers (e.g., E-glass, A-glass, C-glass, D-glass, AR-glass, R-glass, S1-glass, S2-glass, etc.), carbon fibers (e.g., amorphous carbon, graphitic carbon, or metal-coated carbon, etc.), boron fibers, ceramic fibers (e.g., alumina or silica), aramid fibers (e.g., Kevlar® marketed by E. I. duPont de Nemours, Wilmington, Del.), synthetic organic fibers (e.g., polyamide, polyethylene, paraphenylene, terephthalamide, polyethylene terephthalate and polyphenylene sulfide), and various other suitable natural or synthetic inorganic or organic fibrous materials.

The first rotor blade section 30 and/or the second rotor blade section 33 each may be formed from any suitable material, which may serve to provide an overall structural integrity to the shell of the rotor blade 16, such as, but not limited to, a balsa material, such as balsa wood; a polyvinyl chloride ("PVC") material; or a polyurethane ("PU" material).

The structural member 37 may be formed from any suitable material, which may serve to reinforce the rotor blade 16. In exemplary embodiments, the structural member 37 may be formed from a suitable composite material, as discussed above. Further, generally unidirectional composite materials are particularly suitable for applications in structural member 37. The direction of the unidirectional fibers of a unidirectional composite material may in exemplary embodiments be in the span-wise direction.

The rotor blade 16 generally provided in FIGS. 1-6 may further define a flange 38 extended generally from root 34 to tip 32 of the rotor blade 16. The flange 38 defines a third locating datum 43 through the flange 38. In various embodiments, the third locating datum 43 defines a through hole, such as drilled or bored through the flange 38, that may further provide positioning, locating, or placement of the rotor blade 16 onto the assembly fixture 100.

Figure 7:
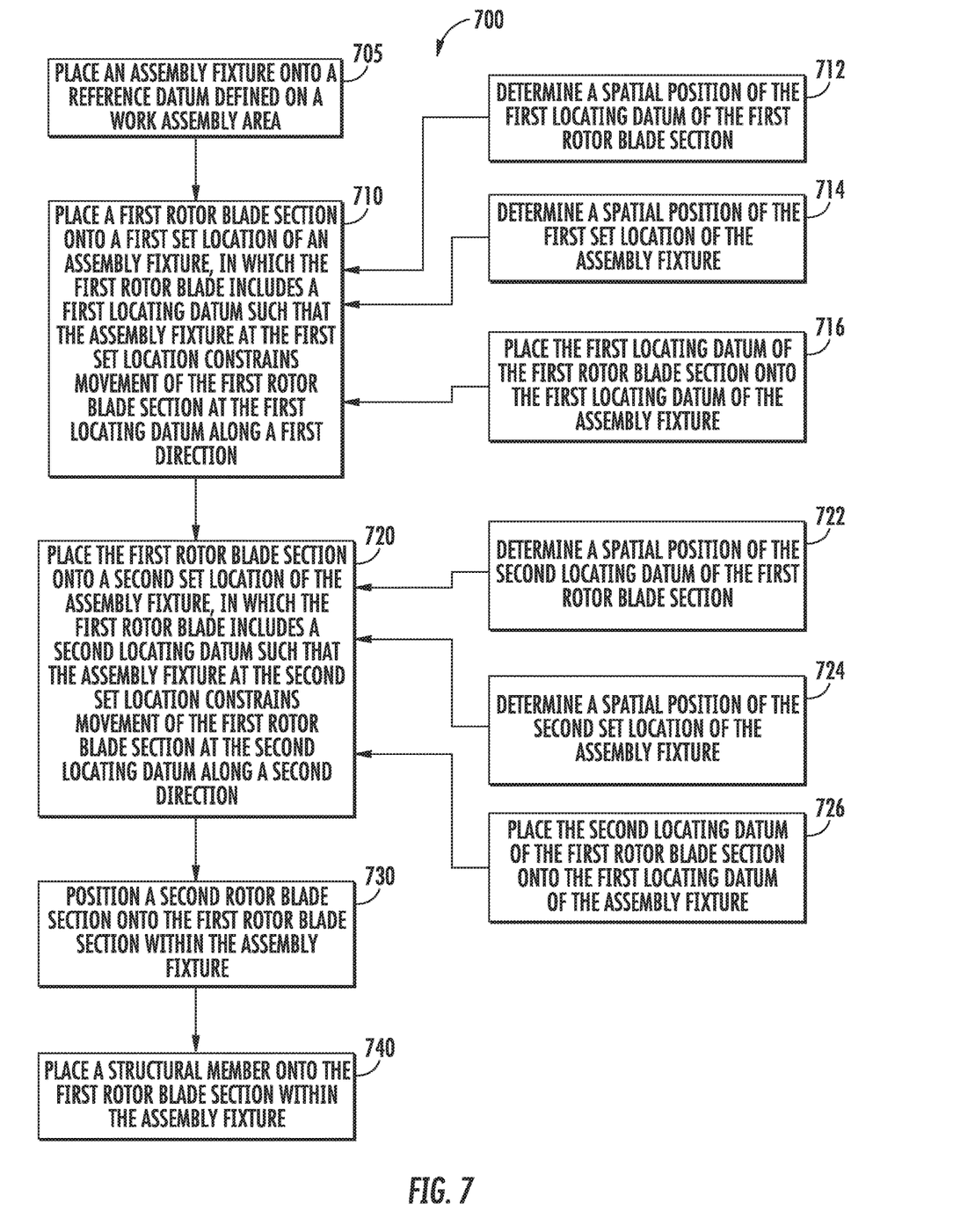
FIG. 7 is a flowchart outlining exemplary steps of a method of assembling a rotor blade for a wind turbine.

Referring now to FIG. 7, an exemplary flowchart outlining steps of a method of assembly of a rotor blade for a wind turbine is generally provided (hereinafter referred to as "method 700"). The method 700 may be performed using the assembly fixture 100 and the rotor blade 16 generally shown and described in regard to FIGS. 1-6. The method 700 may generally provide flexible and modular assembly of a rotor blade (e.g., rotor blade 16) for a wind turbine through modular tooling that may connect to one another via locating features (e.g., first locating datum 41, second locating datum 42, third locating datum 43, first set location 111, and second set location 112) such that a plurality of modular tooling (e.g., assembly fixture 100) may be assembled to make any rotor blade length by adding or removing modular tooling sections. As such, the method 700 may enable increased scale production of rotor blades for wind turbines. Additionally, the method 700 may enable increased versatility or changeover in types, sizes, lengths, or contours of rotor blade assembly for wind turbines along a single production line. Although the method 700 generally recites steps outlined in a certain order as presented, it should be appreciated that steps may be added, omitted, or re-arranged without deviating from the scope of the method.

The method 700 includes at 710 placing a first rotor blade section onto a first set location of an assembly fixture, in which the first rotor blade includes a first locating datum such that the assembly fixture at the first set location constrains movement of the first rotor blade section at the first locating datum along a first direction; at 720 placing the first rotor blade section onto a second set location of the assembly fixture, in which the first rotor blade includes a second locating datum such that the assembly fixture at the second set location constrains movement of the first rotor blade section at the second locating datum along a second direction; and at 730 positioning a second rotor blade section onto the first rotor blade section within the assembly fixture.

In one embodiment at 710, placing the first rotor blade section onto the first set location of the assembly fixture further includes at 712 determining a spatial position of the first locating datum of the first rotor blade section; at 714 determining a spatial position of the first set location of the assembly fixture; and at 716 placing the first locating datum of the first rotor blade section onto the first locating datum of the assembly fixture.

In another embodiment at 720, placing the first rotor blade section onto the second set location of the assembly fixture further includes at 722 determining a spatial position of the second locating datum of the first rotor blade section; at 724 determining a spatial position of the second set location of the assembly fixture; and at 726 placing the second locating datum of the first rotor blade section onto the second locating datum of the assembly fixture.

For example, in various embodiments, the method 700 at 712, 714, 722, and/or 724 includes measuring the first rotor blade section and the assembly fixture using an interferometer, such as, but not limited to optical coherence tomography or structured light measurement system. For example, the interferometer may include a white light scanner or a blue light scanner. In various embodiments, measuring the first rotor blade section 30 and the assembly fixture 100 includes measuring using an imaging device, such as an interferometer, or a proximity sensor, or combinations thereof. Proximity sensors may include generally sensors that at least emit or retrieve electromagnetic signals and process changes in said electromagnetic signals. For example, proximity sensors may include, but are not limited to, capacitive, infrared, inductive, magnetic, sonic or ultrasonic proximity sensors, LIDAR, RADAR, or laser rangefinders.

In still various embodiments at 710, placing a first rotor blade section onto the first set location of the assembly fixture includes constraining the first rotor blade section along a transverse direction. In one embodiment, placing the first rotor blade section onto the first set location includes placing the first rotor blade into one or more first slots defined generally along a longitudinal direction included in the assembly fixture.

In various embodiments at 720, placing a first rotor blade section onto the second set location of the assembly fixture includes constraining the first rotor blade section along a longitudinal direction. In one embodiment, placing the first rotor blade section onto the second set location includes placing the first rotor blade into one or more second slots defined generally along a transverse direction included in the assembly fixture.

In still various embodiments at 710, the first rotor blade section includes one or more of a root section or a mid-section each defining a pressure side or a suction side, a leading edge and a trailing edge, and wherein placing the first rotor blade section onto the first set location of the assembly fixture defines a contour corresponding to the first rotor blade section.

In one embodiment at 720, positioning the second rotor blade section onto the first rotor blade section within the assembly fixture includes positioning the second rotor blade section comprising one or more of a root section or a mid-section each defining a suction side or a pressure side generally corresponding to the pressure side or suction side of the first rotor blade section.

The method 700 may further include at 705 placing an assembly fixture onto a reference datum defined on a work assembly area. The work assembly area may include a floor, base, platform, or other plane onto which the assembly fixture is placed. Placing the assembly fixture onto a reference datum at 705 may include locking, securing, or otherwise constraining the assembly fixture 100.

In another embodiment, the method 700 further includes at 740 placing a structural member onto the first rotor blade section within the assembly fixture. For example, in various embodiments, the method 700 at 740 includes positioning a spar box, a T-box, or shear web within the first rotor blade section.

The method 700 may enable flexible and modular adoption of modular tooling, such as a plurality of the assembly fixture 100, that connect to each other via locating features such that a plurality of the assembly fixture 100 can be assembled to make up any rotor blade 16 length by adding or removing one or more of the assembly fixture 100. The assembly fixtures 100 may also be locked, secured, or otherwise constrained to a floor or base to establish a world reference datum. The world reference datum may work in tandem with an overhead tooling or lifting system such as, but not limited to, a gantry system, a double gantry system, a crane, or other moveable supporting framework, located above a workplace including each assembly fixture 100 for the pick-up and drop-off of rotor blade sections 30, 33 and assembly fixtures 100 and other tooling. The overhead tooling system may span the work assembly area including the assembly fixtures 100 and an staging area for the rotor blades 16, or portions thereof, and the overhead tooling system (e.g., a double gantry) may work in tandem to lift generally heavy or large-size load structures, such as, but not limited to, the structural members 37, the first rotor blade section 30, or the second rotor blade section 33. The overhead tooling system may also include an end-effector quick change (e.g., a device at an end of a robotic arm or member that may interact with the environment) that may perform multiple process operations including, but not limited to, acquiring, dispensing, or utilizing inspection or measurement probes. The overhead tooling system may be operated manually or automatically, such as through a computer-implemented program through one or more computing devices including one or more processors and memory devices executing one or more instructions, or in conjunction with one or more measurement devices, such as an imaging device or proximity probe as described herein.

Automation of the method 700 may be enabled via the locating features (e.g., first locating datum 41, second locating datum 42, third locating datum 43, first set location 111, and second set location 112) to adhere to, acquire, and place the first rotor blade section 30, the structural members 37, and the second rotor blade section 33 onto the assembly fixture 100. For example, the first locating datum 41 defining transverse pads may be defined onto each first rotor blade section 30 to locate and constraint the rotor blade section 30 in a first direction (such as described in method 700 at step 710) and the second locating datum 42 defining a longitudinal flange may be defined on each first rotor blade section 30 to locate and constrain the panel in a second direction (such as described in method 700 at step 720), thereby constraining the first rotor blade section 30 in the plane of its resting position on the assembly fixture 100. Each of the first locating datum 41 and the second locating datum 42 (e.g., defining transverse and longitudinal pads, respectively) have a draft angle to wedge the first rotor blade section 30 into its resting place thereby enabling accurate placement or positioning into its resting position. Steel locator wear in the assembly fixture 100 may not impact the positioning accuracy of the first rotor blade section 30. The flange 38 defined in the rotor blade 16 may define stepped flanges on the leading edge 26, the trailing edge 28, or both, and shiplap flanges for inner side to side connections (e.g., first rotor blade section 30 and second rotor blade section 33 connections) are added to facilitate locating and locking the first rotor blade section 30 and the second rotor blade section 33 as they are assembled together, such as described in regard to method 700 at step 730.

The first rotor blade section 30 and the second rotor blade section 33 may each be placed onto their respective assembly fixture 100 using the first locating datum 41 and second locating datum 42 (e.g., transverse and longitudinal features) as described herein. The assembly fixture 100 may include lower locating pins for work assembly area floor positioning to establish the world reference datum. For example, the overhead tooling may move and place the assembly fixture 100 and lowers it onto the holes in the floor, such as described in regard to method 700 at 705. Once the spatial position of the assembly fixture 100 (e.g., at method 700 steps 714 or 724) located the overhead tooling may disengage and proceed to acquire, adhere, and place the next set of assembly fixtures 100 and repeats until the entire first rotor blade section 30 (e.g., the lower shell) including the root section 34 and the mid-section 36 is assembled. The assembly fixture 100 may further include locating holes on an upper surface for placement of upper shell fixtures to enable an accurate locating scheme between upper and lower steel frame assembly fixtures 100 and between overhead tooling and reference data.

Overhead tooling (e.g., a gantry or double gantry) with dedicated tooling is used to acquire, adhere, and place structural members 37 (e.g., spar box, T-box) in addition to previously assembled upper shell sections of the rotor blade 16 (e.g., root section 34, mid-sections 36, etc.) into the rotor blade assembly 16. The assembly fixture 100 may further act as a nest for second rotor blade sections 33 (e.g., upper shell sections) for accurate positioning and as a clamping frame.

The method 700 and structures generally provided in FIGS. 1-7 and described herein may enable concurrent or parallel assembly of the first rotor blade section 30 defining a lower shell of the rotor blade 16 and the second rotor blade section 33 defining an upper shell. The first rotor blade section 30 and the second rotor blade section 33 are then coupled together at the assembly fixture 100, fixed, located, or otherwise constrained via the locating data and set locations as described herein. The method 700 and structures generally provided herein may enable increased production and decreased cost of production of rotor blades 16 for wind turbines.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of assembling a rotor blade for a wind turbine, the method comprising:

placing a first rotor blade section onto a first set location of an assembly fixture, wherein the first rotor blade section includes a first locating datum, the first locating datum interfacing with the first set location such that the interfacing constrains movement of the first rotor blade section along a first direction, wherein the first locating datum comprises a raised surface extending outward from a first exterior surface of the first rotor blade section, wherein the first set location defines a slot, wherein the first locating datum is placed into the first set location, and wherein the first locating datum and the first set location define corresponding draft angles configured to wedge the first rotor blade section into a resting position;

placing the first rotor blade section onto a second set location of the assembly fixture, wherein the first rotor blade includes a second locating datum, the second locating datum interfacing with the second set location such that the interfacing constrains movement of the first rotor blade section along a second direction, wherein the second locating datum comprises a raised surface extending outward from the first exterior surface, wherein the second set location defines a slot, and wherein the second locating datum is placed into the second set location; and positioning a second rotor blade section onto the first rotor blade section within the assembly fixture.

2. The method of claim 1, wherein placing the first rotor blade section onto the first set location of the assembly fixture comprises:

determining a spatial position of the first locating datum of the first rotor blade section;

determining a spatial position of the first set location of the assembly fixture; and placing the first locating datum of the first rotor blade section onto the first set location of the assembly fixture.

3. The method of claim 2, wherein determining the spatial position includes measuring the first rotor blade section and the assembly fixture using an optical coherence tomography measurement system.

4. The method of claim 1, wherein placing the first rotor blade section onto the second set location of the assembly fixture comprises:

determining a spatial position of the second locating datum of the first rotor blade section;

determining a spatial position of the second set location of the assembly fixture; and placing the second locating datum of the first rotor blade section onto the second set location of the assembly fixture.

5. The method of claim 1, wherein constraining movement of the first rotor blade section along the first direction placing a first rotor blade section onto the first set location of the assembly fixture includes constraining the first rotor blade section along a transverse direction.

6. The method of claim 5, wherein placing the first rotor blade section onto the first set location includes inserting the first locating datum into the first set location, the first set location being defined by one or more first slots along a longitudinal direction of the assembly fixture.

7. The method of claim 1, wherein constraining movement of the first rotor blade section along the second direction includes constraining the first rotor blade section along a longitudinal direction.

8. The method of claim 7, wherein placing the first rotor blade section onto the second set location includes inserting the second locating datum into the second set location, the second set location being defined by one or more second slots along a transverse direction of the assembly fixture.

9. The method of claim 1, wherein the first rotor blade section includes one or more of a root section or a mid-section each defining a pressure side or a suction side, a leading edge and a trailing edge, and wherein placing the first rotor blade section onto the first set location of the assembly fixture defines a contour corresponding to the first rotor blade section.

10. The method of claim 1, wherein positioning the second rotor blade section onto the first rotor blade section within the assembly fixture includes positioning the second rotor blade section comprising one or more of a root section or a mid-section each defining a suction side or a pressure side generally corresponding to the pressure side or suction side of the first rotor blade section.

11. The method of claim 1, the method further comprising:

placing a structural member onto the first rotor blade section within the assembly fixture.

12. The method of claim 11, wherein placing the structural member includes positioning a spar box, a T-box, or shear web within the first rotor blade section.

13. The method of claim 1, further comprising placing the first rotor blade section onto a third set location of an assembly fixture, wherein the first rotor blade includes a third locating datum defining a locating orifice along a span-wise flange of the first rotor blade section.

14. A rotor blade assembly for a wind turbine, the rotor blade assembly comprising:

a first rotor blade section defining a root section or a mid-section, wherein the first rotor blade section defines a first exterior surface defining a pressure side or a suction side, and wherein the first exterior surface defines a first locating datum and a second locating datum, the first locating datum and the second locating datum comprising a raised surface extending outward from the first exterior surface, the first and second locating datums being configured to interface with corresponding first and second set locations such that the interfacing constrains movement of the first rotor blade section along a first direction, wherein the first and second set locations define a slot configured to receive the first and second locating datums, and wherein the first locating datum and the first set location define corresponding draft angles configured to wedge the first rotor blade section into a resting position.

15. The rotor blade assembly of claim 14, wherein the first locating datum defines a transverse constraining feature extended at least partially along a longitudinal direction.

16. The rotor blade assembly of claim 14, wherein the second locating datum defines a longitudinal constraining feature extended at least partially along a transverse direction.

17. The rotor blade assembly of claim 14, the rotor blade assembly further comprising:

a second rotor blade section defining a root section or a mid-section, wherein the second rotor blade section defines a second exterior surface defining a suction side or a pressure side generally corresponding to the pressure side or suction side of the first rotor blade section, and wherein the second rotor blade section is coupled to the first rotor blade section.

18. The rotor blade assembly of claim 14, wherein the first rotor blade section and the second rotor blade section together define a flange extended generally from root to tip of the rotor blade assembly, and wherein the flange defines a third locating datum through the flange.

* * * * *